United States Patent
Roth et al.

(10) Patent No.: US 6,464,752 B1
(45) Date of Patent: Oct. 15, 2002

(54) METHOD FOR PRODUCING DIRECTLY REDUCED, DESULPHURIZED IRON

(75) Inventors: Jean-Luc Roth, Thionville (FR); Thomas Hansmann, Trier (DE); Romain Frieden, Beidweiler (LU); Marc Solvi, Ehlange s/Mess (LU)

(73) Assignee: Paul Wurth S.A., Luxembourg (LU)

( * ) Notice: Subject to any disclaimer, the term of this patent is extended or adjusted under 35 U.S.C. 154(b) by 0 days.

(21) Appl. No.: 09/830,561

(22) PCT Filed: Nov. 4, 1999

(86) PCT No.: PCT/EP99/08440

§ 371 (c)(1), (2), (4) Date: May 7, 2001

(87) PCT Pub. No.: WO00/28095

PCT Pub. Date: May 18, 2000

(30) Foreign Application Priority Data

Nov. 5, 1998 (LU) .................................................. 90314

(51) Int. Cl.[7] ............................................. C21B 13/08
(52) U.S. Cl. ........................................................ 75/483
(58) Field of Search ............................................ 75/483

(56) References Cited

U.S. PATENT DOCUMENTS

| | | |
|---|---|---|
| 2,089,782 A | 8/1937 | Carlsson |
| 2,792,298 A | 5/1957 | Freeman |
| 3,756,804 A | 9/1973 | Stevenson |
| 4,212,452 A * | 7/1980 | Hsieh .......................... 266/177 |
| 6,383,252 B1 * | 5/2002 | Roth et al. ..................... 75/483 |

FOREIGN PATENT DOCUMENTS

| | | |
|---|---|---|
| BE | 1 008 579 | 6/1996 |
| DE | 12 25 673 | 9/1966 |

* cited by examiner

*Primary Examiner*—Melvyn Andrews
(74) *Attorney, Agent, or Firm*—Oblon, Spivak, McClelland, Maier & Neustadt, P.C.

(57) ABSTRACT

The invention relates to a method for producing directly reduced, desulfurized iron in a multiple-hearth furnace which comprises two zones arranged one above the other and each having several hearths. Iron ore is reacted with a reducing agent in a first zone of the multiple-hearth furnace at a temperature ranging from 800° C. to 1100° C. to obtain metallic iron. In addition, the gases are desulfurized using desulphurizing agents, whereby the directly reduced iron is discharged from the multiple-hearth furnace and the desulfurized gases are guided into a second zone where the iron ore is preheated to a temperature ranging from 600° C. to 800° C.

12 Claims, 1 Drawing Sheet

METHOD FOR PRODUCING DIRECTLY REDUCED, DESULPHURIZED IRON

Figure 1:
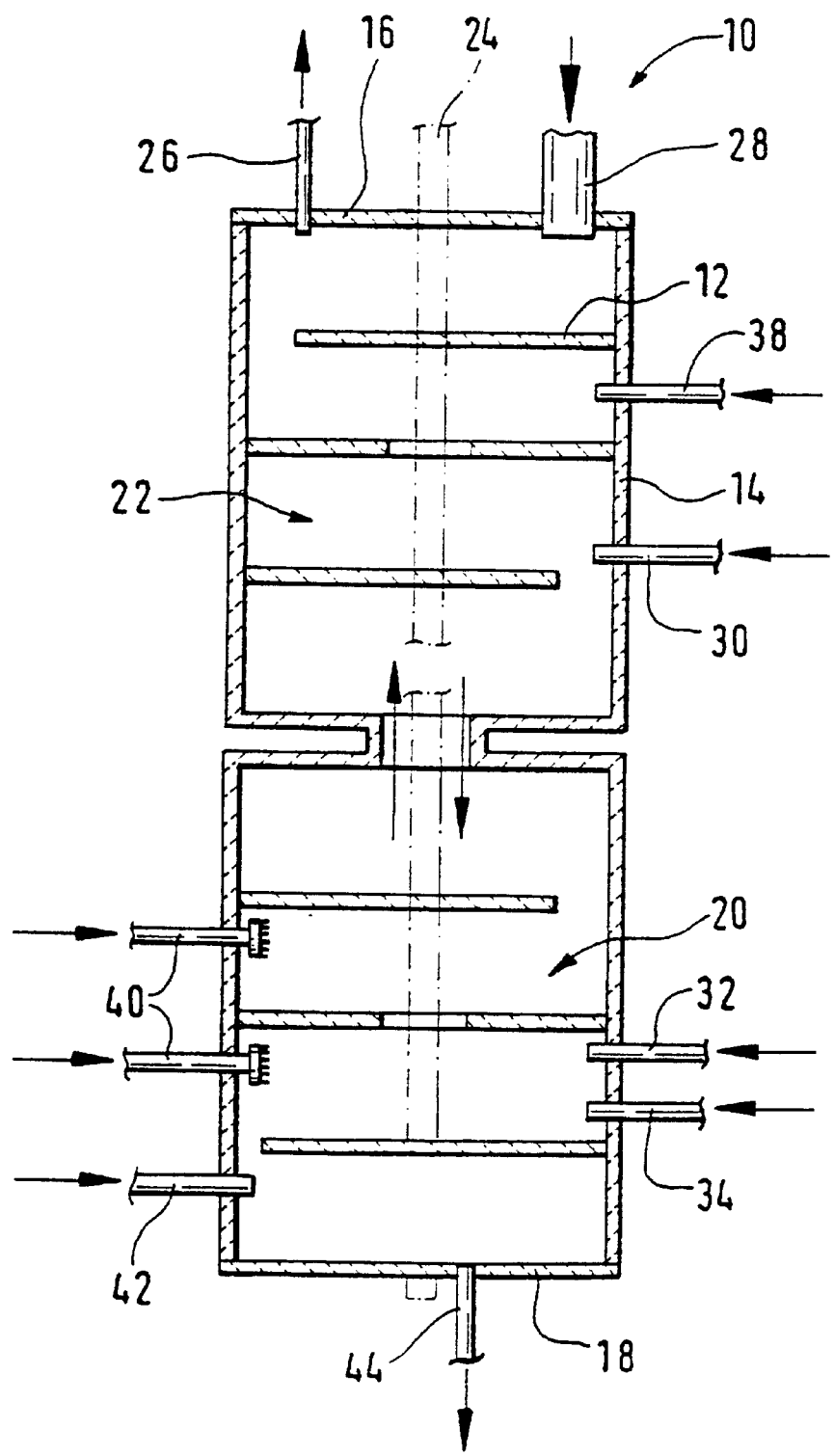

The invention relates to a process for production of directly reduced desulphurised iron.

The production of directly reduced iron takes place in a direct reduction process by the reduction of iron oxide with solid or gaseous reducing agents. Coal, for example, which reacts with carbon dioxide at higher temperatures and forms the reducing gas CO, serves as a solid reducing agent. As the coal contains a relatively large amount of sulphur and the iron ore used often also contains this element, both the iron produced and the waste gases have an excessively high sulphur content. Subsequent desulphurisation of the waste gases and the directly reduced iron is expensive.

Task of the Invention

The task of the invention is to propose a process for production of directly reduced, desulphurised iron.

General Description of the Invention

According to the invention this problem is solved by a process for production of directly reduced, desulphurised iron in a multiple-hearth furnace, which has two zones one above the other, each with several hearths, iron ore reacting with a carbon carrier at a temperature between 800° C. and 1100° C. and becoming metallic iron and the gases being desulphurised with desulphurising agents in a first zone of the multiple-hearth furnace, the directly reduced iron being discharged from the multiple-hearth furnace and the desulphurised gases conducted into the second zone, where they preheat the iron ore to between 600° C. and 800° C.

The sulphur content of the gases is reduced within the multiple-hearth furnace by this process. With direct reduction of iron ore sulphur is released during gasification of the reducing agent, e.g. coal. A smaller quantity of sulphur may also be released during the reduction from iron ore to iron. This sulphur is bound in this process within the first zone and can therefore no longer react, or react only to a lesser extent, with the iron ore and the iron formed. Hence the directly reduced iron produced according to this process has a clearly lower sulphur content.

The desulphurising agents contain, for example, lime (CaO), limestone ($CaCO_3$) and/or magnesite (MgO). The desulphurisation of the gases advantageously takes place largely within this first zone by chemical reaction of the gases containing sulphur with these desulphurising agents, the sulphur reacting with the calcium and/or magnesium to form sulphates, sulphites, sulphides and the like. These compounds are formed preferably on the surface of the desulphurising agent. An advantage of these agents is that they have a positive effect on the slag properties when they are melted together with the directly reduced iron.

The multiple-hearth furnace has a first zone and a second zone, which each comprise several hearths. The second zone advantageously lies above the first zone and the gases rise from the first zone to the second one, whereas the solids are gradually transferred from the second zone into the first zone.

The solids, i.e. the iron ore and reducing agent, can be introduced separately or together into the multiple-hearth furnace. According to a preferred embodiment the iron ore is first charged to the top hearth of the multiple-hearth furnace in the second zone. It is circulated there by rakes, which project over the hearths, and gradually transferred to the underlying hearths. The reducing agent is then charged to a hearth further down in the multiple-hearth furnace, preferably in the lower section of the second zone, and mixed with the preheated iron ore. Agglomeration of the reducing agent and the ore is prevented by the continuous circulation. The reducing agents are, for example, bituminous coal, lignite, coke, etc.

According to a preferred embodiment desulphurising agents and a reducing agent are mixed with the iron ore in the second zone.

The desulphurising agents can be introduced together with the iron ore and/or the carbon carrier into the multiple-hearth furnace. However, they can also be introduced separately into the multiple-hearth furnace.

Depending on the sulphur content of the reducing agent the desulphurising agents can either be fed at one point into the multiple-hearth furnace or distributed and charged at various points. In the latter alternative, different particle sizes can also be used. It has proved to be advantageous to charge coarse-grained desulphurising agents in the second zone and powdered desulphurising agents in the first zone. Depending on the granulometry of the particles the latter are discharged with the gases or solids from the multiple-hearth furnace. Powdered desulphurising agent is advantageously introduced directly into the gas flow in the first zone, with the result that the desulphurisation is more effective. The powdered desulphurising agents enriched with sulphur are largely discharged with the gases from the multiple-hearth furnace.

The solids, i.e. the iron formed, the residues of the carbon carrier and the desulphurising agents are discharged from the multiple-hearth furnace and subsequently melted. The desulphurising agents together with the gangue of the ore form a slag, and the combined sulphur is disposed of together with the slag.

The reduction gases in the furnace can be adjusted to an optimum concentration by selective feeding of reducing agents into the lower hearths of the multiple-hearth furnace and thus a better degree of metallisation achieved.

In addition a gaseous reducing agent can be injected into the bottom hearths of the multiple-hearth furnace. Consequently more complete reduction of the ore is achieved.

All rising gases, including the volatile constituents of the reducing agents, can be subsequently burnt in the upper part of the furnace, i.e. in the second zone, and the residual heat of the gases inside the furnace can thus be utilised in an optimum manner. Good thermal efficiency is accordingly achieved, because the energy yield is better.

The multiple-hearth furnace can be operated under a specific overpressure to achieve a further increase in productivity.

According to a preferred embodiment the ore in the topmost hearths of the furnace is dried and preheated by the hot gases in the furnace and in contact with the hearths before it comes into contact with the reducing agent. The ore is heated to a temperature of at least 400° C., preferably to at least 600° C. to 700° C., before the solid reducing agent is added.

Gases containing oxygen can be injected selectively on the hearth, where the heat requirement must be covered by combustion of the excess process gases, e.g. above the hearth, where the solid reducing agents are introduced.

It is advantageous to use gases containing oxygen which have a temperature of at least 350° C.

In addition one or more hearths in the furnace which are below the hearth to which the solid reducing agents are introduced can be heated by burners.

DESCRIPTION WITH THE AID OF THE FIGURES

An embodiment of the invention will now be described below with the aid of the enclosed figures.

FIG. 1 is a section through a multiple-hearth furnace for production of directly reduced, desulphurised iron.

FIG. 1 shows a section through a multiple-hearth furnace 10, which has several hearths 12 one above the other. These unsupported hearths 12, as well as the shell 14, cover 16 and bottom 18 of the furnace are made from refractory material.

The multiple-hearth furnace 10 is divided into two zones one above the other, viz. a first zone 20 and a second zone 22.

An exhaust 26, through which the gases can be evacuated from the furnace, and an opening 28, through which the ore can be charged to the top hearth, are provided in the cover 16 of the furnace 10.

A shaft 24, on which rakes projecting over the respective hearths are fitted, is installed in the centre of the furnace 10.

The rakes are designed in such a way that they circulate the material on one hearth from the inside outwards and then on the underlying hearth from the outside inwards in order to transport the material in this way from the top downwards through the furnace. The shaft 24 and the rakes are air-cooled, and openings, through which the air can flow into the furnace interior and be used there for after-combustion, are provided on the rakes.

After the ore is charged to the first hearth, it is circulated by the rakes and conveyed to the edge of the hearth, from where it falls through several openings provided for this purpose on to the underlying hearth. The ore is conveyed to the centre of the hearth and then falls on to the underlying hearth. During this time the ore is dried by contact with the hearth and the rising hot gases and heated to about 600° C.

Inlet openings 30, 32, 34, through which solid materials are introduced into the furnace, are provided in the side walls of the multiple-hearth furnace 10. These solid materials are firstly carbon carriers such as lignite coke, petroleum coke, blast furnace dust, coal or the like and, secondly, desulphurising agents such as lime (CaO), limestone ($CaCO_3$) and/or magnesite (MgO).

The carbon carrier is introduced to a hearth through openings 30, 34 into both zones 20, 22 and mixed with the heated ore by the rakes 22. The coal is gasified by the high temperature and carbon monoxide is formed, with the result that the iron oxide present in the ore is gradually reduced to metallic iron during transport through the multiple-hearth furnace 10.

The desulphurising agents are introduced into the multiple-hearth furnace at several points. Coarse-grained desulphurising agent is introduced together with the iron ore through the opening 28 and/or together with carbon carriers through the openings 30 into the multiple-hearth furnace.

In addition powdered desulphurising agent is injected into the rising gases through the opening 32 in the first zone 20.

In this process sulphur is released in two stages. Up to approximately 600° C. the "mineral" sulphur, which is present in the ore or carbon carrier in the form of $CaSO_4$ and $FeS_2$ is released first in the form of $H_2S$. Above a temperature of about 800° C. the sulphur present in the carbon carrier in "organic" form is then released. Under the conditions prevailing in the multiple-hearth furnace 10 this sulphur reacts preferentially with the desulphurising agents and can thus not react with the iron ore and iron. The gases are accordingly desulphurised and the iron produced contains less sulphur than in conventional processes.

Nozzles 38 for injection of hot (350° C. to 500° C.) gases containing oxygen, through which air or another gas containing oxygen can be fed into the furnace 10, are provided in the side wall. As a result of the high temperatures and the presence of oxygen some of the carbon is burnt to carbon dioxide, which in turn reacts with the carbon present in excess and is converted to carbon monoxide. The carbon monoxide finally reduces the iron oxide to metallic iron. As this reaction is predominantly endothermal, it is logical to install in the lower part of the furnace burners 40, which ensure a uniformly high temperature in the bottom hearths of the furnace. Gas or pulverised coal burners can be used here.

These burners can be fired with gas or pulverised coal with air for preheating and/or additional heating. An additional reduction gas can be produced by the quantitative ratio between oxygen and fuel, or in the event of excess air after-combustion of the process gases is achieved. In the case of pulverised coal firing an excess of carbon monoxide can be produced in the burner. With external combustion chambers the ash from the burnt coal can be prevented from entering the furnace and mixing with the directly reduced iron. The consumption of carbon carriers in the furnace 10 and thus also the ash content in the end product are reduced by the production of carbon monoxide.

In the final or final two stages provision is made for feeding a gaseous reducing agent, e.g. carbon monoxide or hydrogen, through special nozzles 42. In this oxygen-free atmosphere the reduction of the ore can be completed.

The directly reduced iron is subsequently discharged together with the ash from the reducing agents through the outlet 44 in the bottom 18 of furnace 10.

The controlled feed of solid and gaseous reducing agents, gases containing oxygen and desulphurising agents at various points of the multiple-hearth furnace 10 permits accurate control of ore reduction and realisation of the process under optimum conditions.

What is claimed is:

1. A process for producing directly reduced iron, the process comprising
    providing a multiple-hearth furnace comprising a first zone below a second zone, where each of the first zone and the second zone includes several hearths;
    feeding an iron ore into the second zone;
    feeding a reducing agent into at least one of the first zone and the second zone;
    forming a gas comprising sulfur from sulfur in at least one of the iron ore and the reducing agent;
    contacting the gas comprising sulfur with a desulphurising agent to form a desulphurised gas;
    preheating the iron ore in the second zone with the desulphurised gas to a temperature between 600° C. and 800° C. to form a preheated iron ore;
    transferring the preheated iron ore from the second zone to the first zone; and
    reacting the preheated iron ore in the first zone at a temperature between 800° C. and 1100° C. to form the directly reduced iron.

2. The process according to claim 1, wherein the desulphurising agent contains at least one of lime, limestone, and magnesite.

3. The process according to claim 1, wherein
    the reducing agent is a solid reducing agent; and
    the process further comprises drying the iron ore in the second zone and subsequently heating the dried iron ore to a temperature of at least 600° C. before adding the solid reducing agent to the dried iron ore in the second zone.

4. The process according to claim 1, further comprising feeding the desulphurising agent into the second zone.

5. The process according to claim 1, further comprising feeding a first portion of the desulphurising agent into the first zone; and feeding a second portion of the desulphurising agent into the second zone.

6. The process according to claim 5, wherein the first portion of the desulphurising agent has a different granularity than the second portion of the desulphurising agent.

7. The process according to claim 5, wherein the first portion of the desulphurising agent is powdered, and the second portion of the desulphurising agent is coarse-grained.

8. The process according to claim 1, wherein the reducing agent is a solid reducing agent; and the process further comprises drying the iron ore in the second zone and subsequently heating the dried iron ore to a temperature of at least 400° C. before adding the solid reducing agent to the dried iron ore in the second zone.

9. The process according to claim 1, further comprising injecting gases containing oxygen into the first zone.

10. The process according to claim 1, wherein the first zone includes a first bottom hearth at the bottom of the first zone;

the second zone includes a second bottom hearth at the bottom of the second zone;

the reducing agent is at least one of a solid reducing agent and a gaseous reducing agent; and the process further comprises introducing the least one of a solid reducing agent and a gaseous reducing agent into at least one of the first bottom hearth and the second bottom hearth.

11. The process according to claim 1, further comprising heating one or more hearths in the multiple-hearth furnace with burners.

12. The process according to claim 1, wherein the process takes place under overpressure.

* * * * *